(12) United States Patent
Sweeney et al.

(10) Patent No.: US 7,424,016 B2
(45) Date of Patent: Sep. 9, 2008

(54) DISTRIBUTING A STREAM OF PACKETS ACROSS AVAILABLE OUTPUT PATHS WITHIN A NETWORK

(75) Inventors: Adam Sweeney, San Jose, CA (US); Fusun Ertemalp, Menlo Park, CA (US); Hugh Holbrook, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 534 days.

(21) Appl. No.: 11/099,750

(22) Filed: Apr. 5, 2005

(65) Prior Publication Data

US 2006/0221930 A1 Oct. 5, 2006

(51) Int. Cl.
*H04L 12/28* (2006.01)
(52) U.S. Cl. .................................. 370/389; 370/392
(58) Field of Classification Search .................. 370/351
See application file for complete search history.

(56) References Cited

U.S. PATENT DOCUMENTS 6,553,029 B1* 4/2003 Alexander .................. 370/389
6,980,521 B1* 12/2005 Jarvis ......................... 370/238
2002/0083033 A1* 6/2002 Abdo et al. ..................... 707/1
2003/0182291 A1* 9/2003 Kurupati et al. ............. 707/100
2005/0147113 A1* 7/2005 Brown ......................... 370/428
2006/0013212 A1* 1/2006 Singh et al. ................. 370/389
2006/0176809 A1* 8/2006 Lea et al. ..................... 370/229

* cited by examiner

*Primary Examiner*—Chau T. Nguyen
*Assistant Examiner*—Louis Bell
(74) *Attorney, Agent, or Firm*—Trellis Intellectual Property Law Group, PC (57) ABSTRACT

Methods and systems for distributing packets across all available output paths within a network is provided. A distribution key is extracted from each packet and is hashed to generate a hash value. An output path for each packet is selected by using all N bits of the hash value to address a distribution table having at least $2^N$ indications of the output paths available for that packet. Thus, the stream of packets is distributed, or split up, across the available output paths, thereby balancing the load. In some embodiments, the order of the output paths is randomized within each distribution table. Other embodiments include a forwarding table used to determine the available output paths for a particular packet. In yet other embodiments, the distribution key includes the packet's source and destination; thus preventing packets within the same stream having varying latencies due to traveling along varying paths.

23 Claims, 5 Drawing Sheets

DISTRIBUTING A STREAM OF PACKETS ACROSS AVAILABLE OUTPUT PATHS WITHIN A NETWORK

BACKGROUND OF THE INVENTION

1. Field of Invention

This invention relates to data transmission in a network. More specifically, the invention relates to methods and systems for distributing packets across available output paths in the network.

2. Description of the Background Art

A typical data communication network includes multiple host computers that are linked to each other by a combination of network devices and transmission channels. The data communication network may also include servers, and the like. The network devices are generally switches or routers, which help in transmission of data from a source to a destination in the network. Data is generally transmitted in the form of data packets.

In some cases, there are several output paths available for transmission of a data packet from the source device of the packet to the destination device of the packet. A network device selects the best output path for this purpose, and subsequently transmits the data packet along this output path. The best output path is selected, based on various factors such as the transmission capacity of the output path, output path utilization, and the time required for packet transmission. Hence, when the network device receives a stream of packets from the source, the device attempts to transmit the packets across the best available output path. However, in this attempt, the packet load is not always distributed in a balanced manner and some output paths may be over-utilized and some may be under-utilized.

SUMMARY OF EMBODIMENTS OF THE INVENTION

In one embodiment of the invention, a method of distributing packets across available output paths is provided. The method comprises: (i) extracting a distribution key from each packet; (ii) hashing the distribution key to generate an N bit hash value; and (iii) selecting an output path for each packet from among the available output paths, where the selecting is based on all N bits of the hash value.

In another embodiment of the invention, a system is provided for distributing packets across available output paths. The system comprises: (i) a key extraction circuit configured to extract a distribution key from each packet; (ii) a hash circuit configured to generate an N bit hash value by applying a hash function to the distribution key; and (iii) a selection circuit configured to select an output path for each packet from among the available output paths, where the selection is based on all N bits of the hash value.

In yet another embodiment of the invention, a computer-readable media containing instructions is provided for distributing packets across available output paths in a network.

In some embodiments of the invention, the selection of the output path includes accessing a memory in which indications of the available output paths are held in a randomized order. In some of these embodiments, the randomized order depends on a seed that varies among instances of the system, method, or media that embodies the invention and that are used within the same network.

BRIEF DESCRIPTION OF THE DRAWINGS

The objects, features and advantages of various embodiments of the invention will become apparent from the descriptions and discussions herein, when read in conjunction with the drawings. Technologies related to the invention, exemplary embodiments and uses of the invention are illustrated in the following figures.

DETAILED DESCRIPTION OF EMBODIMENTS OF THE INVENTION

The descriptions, discussions and figures herein illustrate technologies related to the invention, and show examples of the invention and of how the invention can be utilized. Known methods, procedures, systems, circuits or elements may be illustrated and described, without giving details, so as to avoid obscuring the principles of the invention.

Some descriptions and discussions herein use abstract or general terms including but not limited to receive, present, prompt, generate, yes or no. Those skilled in the art use such terms as a convenient nomenclature for components, data or operations within a computer, digital device or electromechanical system. Such components, data and operations are embodied in the physical properties of actual objects, including, but not limited to, electronic voltage, magnetic field and optical reflectivity. Similarly, perceptive or mental terms, including, but not limited to, compare, determine, calculate and control, may also be used to refer to such components, data or operations, or to such physical manipulations.

Various embodiments of the invention provide a method, system, apparatus, and a machine-readable medium for distributing packets across available output paths in a network. Packets are transmitted from a source to a destination in the network. A switch in the network performs the function of transmission. The switch extracts the source and destination address from the packet header. Further, bits in the packet header are hashed. Depending on the hash value and transmission capacity of the available output paths, an output path is selected out of the available output paths for packet transmission. In conventional techniques, only some bits of the hash value are used for selecting the output path in this transmission. Hence, the packet load may not be distributed in a balanced manner. The various embodiments of the invention balance the packet load by distributing the packets across all the available output paths between the source and the destination.

Figure 1:
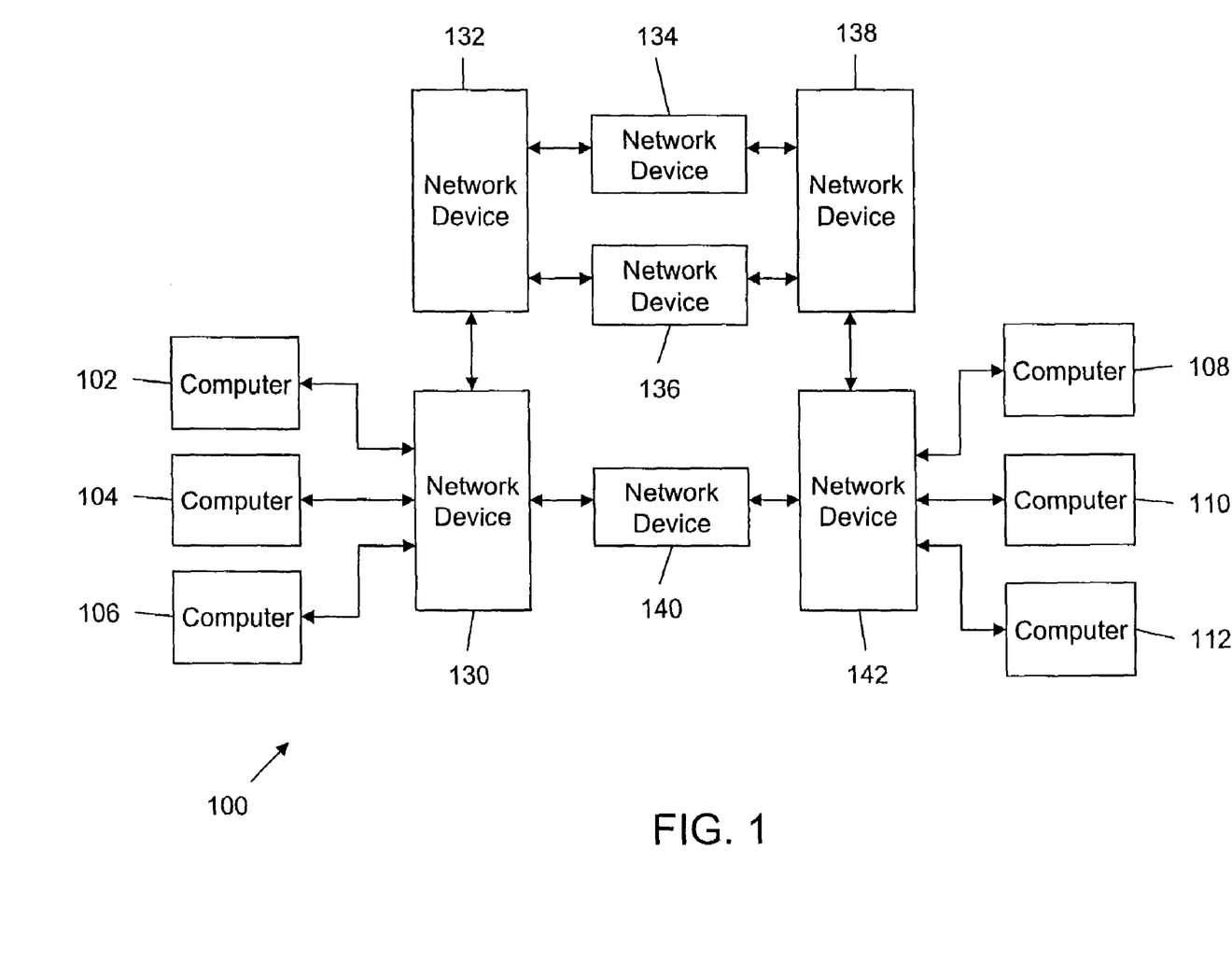
FIG. 1 shows a network in which an embodiment of the present invention can be practiced.

FIG. 1 depicts a representative network 100 in which an exemplary embodiment of the present invention can be practiced.

Network 100 includes: a plurality of computers, hereinafter referred to as computers 102, 104, 106, 108, 110 and 112;

and a plurality of network devices, hereinafter referred to as network devices 130, 132, 134, 136, 138, 140, and 142. Computers 102 to 106 transmit and receive packets via network device 130. Computers 108 to 112 transmit and receive packets via network device 142. Network devices 130 and 142 are connected to each other via three different routes: first, directly via network device 140, second via the chain formed by network devices 132, 134, and 138; and third via the chain formed by network devices 132, 136, and 138.

For example, computers 102 to 106 and network device 130 may be owned by a particular company and located at their facilities in Austin, Tex., while computers 108 to 112 and network device 142 may be owned by that company and located at their facilities in Sunnyvale, Calif. Network devices 132 to 140 may be owned by one or more service providers, that is, companies who sell data communication services. Of these devices, device 140 may be 100% dedicated to the particular company, while devices 132 to 138 may be shared with other customers of the service provider(s).

In various applications of the invention, computers 102 to 112 can include data servers, printers, telephones, personal digital assistants (PDAs), set top boxes (STBs), and the like.

The invention can be embodied within various network devices such as a router, a relay, a bridge, and the like. Some network devices function primarily at the data link layer, that is, Open System Interconnect (OSI) level-2. Other network devices function primarily at the network layer, that is, OSI level-3. Yet other network devices function at a combination of layers 2 and 3, or include functions associated with other layers in the OSI model, or with multiple layers in the OSI model.

A packet originated from computer 102 that is to be transmitted to computer 112, for example, first goes through network device 130. Network device 130 chooses whether the next hop for the packet is to network device 140, or to network device 132. If the packet is routed to device 132, then it decides whether the next hop for the packet is to device 134 or to device 136.

Network 100 performs best when the stream of network traffic between computers 102 to 106, on the one end, and computers 108 to 112 on the other end, is appropriately balanced among the three routes. However, the balance that is appropriate for this stream depends, in general, on the topology of network interconnections, their capabilities and per-use costs (if any), on the capabilities of the network devices used, and on the other uses (if any) of the network facilities.

For example, in some implementations of network 100, performance, reliability, and security may be best if network device 130 splits such traffic 50/50 between network devices 132 and 140, and if device 132 splits such traffic 50/50 between network devices 134 and 136. However, in other implementations it may be best if network device sends ⅓ of this traffic to device 140, and ⅔ of this traffic to network device 132, which splits that traffic 50/50 between network devices 134 and 136.

Generally, it is preferable if all network traffic from a particular computer to another particular computer is conveyed across the same route within network 100. This constraint reduces the number of packets that arrive out of order within a stream of packets, which reduces the need to reorder packets upon arrival at the destination computer. Excess reordering can occur, for example, because devices 134, 136, and 140 have different latencies, or because these devices are currently operating under different loading conditions.

In some situations, however, the network traffic between two computers can be divided into separate streams, for example, one due to an e-mail reading application, one due to a file transfer, and one due to a software update. Each of these streams should have the order of the packets within the stream preserved, but across the streams packets may be mixed in any order. Such streams can generally be distinguished by information within the packet headers, such as the ports specified at the transport level, i.e. ISO layer 4. In such situations, it may in fact be desirable that these separate streams between the same two devices be send via different routes so that the overall network traffic is better balanced.

With respect to the stream of traffic between computers 102 to 106 and 108 to 112 described above, it is preferable that the portion of this stream forwarded from network device 130 to network device 132 is distributed between devices 134 and 136 in an appropriately balanced manner. However, this will not happen if devices 130 and 132 use the same algorithmic computations to decide which of the two available output paths to use for this traffic. Rather if the same algorithm is used, then all packets for which network device 130 chose network device 132 have common attributes in, typically the same data field values within the headers of each packet. Those common attributes in turn cause network device 132 to select only one of devices 134 and 136 for each such packet.

Figure 2:
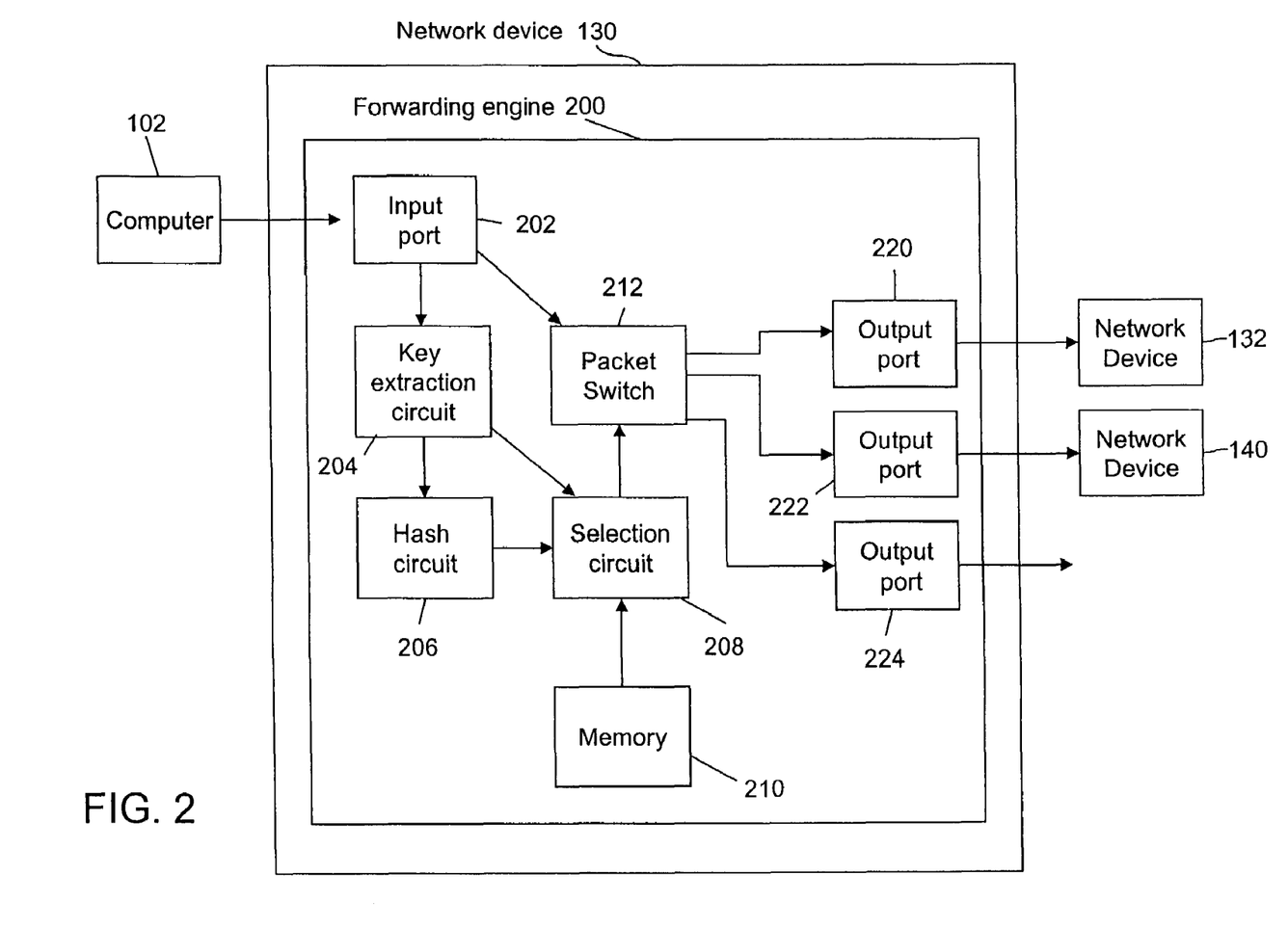
FIG. 2 is a block diagram of a system for distributing packets across available output paths, in accordance with another embodiment of the present invention.

FIG. 2 is a block diagram of a forwarding engine 200, for distributing packets across the available output paths, in accordance with an exemplary embodiment of the present invention. Forwarding engine 200 includes an input port 202, a key extraction circuit 204, a hash circuit 206, a selection circuit 208, a memory 210, a packet switch 212, and multiple output ports 220, 222, and 224.

In the embodiment of the invention shown in FIG. 2, forwarding engine 200 is part of network device 130, has an input port 202 that is coupled to computer 102, and two output ports 220 and 222 that are respectively connected to network devices 132 and 140. Network 100, network devices 130, 132 and 140, and computers 102 and 112 are described with respect to FIG. 1. Device 130 has other input and output ports and connections that, for clarity, are not shown as part of forwarding engine 200 in FIG. 2.

Input port 202 receives a stream of packets from computer 102. Input port 202 forwards the header of the packet onto key extraction circuit 204 and forwards the entire packet onto packet switch 212.

Each packet in this stream contains a header that describes the packet, including an indication of the source of the packet (computer 102, for this example stream) and the destination of the packet (computer 112, for this example stream). Key extraction circuit 204 extracts from the header of each packet both a forwarding key and a distribution key. Key extraction circuit 204 provides the forwarding key to selection circuit 208, and provides the distribution key to hash circuit 206.

In one embodiment of the invention, the forwarding key is the OSI layer 2 media access control (MAC) address of the destination device for the packet, or a subset of that address. In another embodiment, the forwarding key is the OSI layer 3 Internet protocol (IP) address of destination device for the packet. In other embodiments, the forwarding key may include other representations of the destination of the packet, or of the route that the packet is to take. Such representations may use other OSI layers, encoding schemes, or protocols.

In some embodiments of the invention, the distribution key is the IP destination concatenated with the IP source address. In other embodiments, the distribution key is the destination MAC address concatenated with the source MAC address. In yet other embodiments, the distribution key is a subset of the bits within the destination MAC address concatenated with a subset of the bits within the source MAC address, where the subsets are used because using the full MAC addresses would involve hashing too many bits.

In some embodiments of the invention, the distribution key is defined so as to ensure that all packets addressed from a particular source device to a particular destination device are forwarded via the same output path. The desirability of this constraint, and variations on this constraint where separate streams are identified between two devices, are discussed with respect to FIG. 1.

Hash circuit 204 generates a hash value by applying a hash function to the distribution key. A hash is a mathematical function that takes a sequence of bits as input and generates a hash value as output. Hash circuit 204 provides the hash value to selection circuit 208.

In some embodiments of the invention, hash circuit 204 applies a cyclic redundancy check (CRC) polynomial to the distribution key. In a CRC, a mathematical calculation, that is, a hash function, is performed on a block of data. A CRC polynomial has binary coefficients and can be represented conveniently by treating the coefficients as a string of bits. For example, the polynomial $x^4+x^2+x^1+x^0$ corresponds to the number 10111 in binary and the number 23 in decimal. Hash functions in general and CRC polynomials in particular are known in the art.

In other embodiments of the invention, hashing a 32 bit distribution key with a CRC polynomial generates a eight-bit hash value that has 256 possible values. In a more general embodiment, the value generated by the hash function, which may or may not be a CRC polynomial, has N bits.

Selection circuit 208 selects an output path for each packet from among the output paths that are available to reach the destination of that packet. To do this, selection circuit 206 uses the forwarding key, the hash value that is derived from the distribution key, one or more forwarding tables, and one or more distribution tables. Selection circuit 208 provides the selected output path for each packet to packet switch 212.

In the embodiment of the invention shown in FIG. 2, memory 210 is a single component that stores the forwarding and distribution tables. However, descriptions herein of forwarding tables and distribution tables should be understood as descriptions of logical data structures, which may or may not correspond to physical memory units. Various embodiments may store the forwarding and distribution tables in various ways. One or more physical components may be used to hold these tables, where such components are distinct from the physical component that implements selection circuit 210. Alternatively or additionally, one or more memory blocks implemented on the same chip as selection circuit 208 may be used to hold these tables.

Selection circuit 208 provides the selected output path to packet switch 212. Packet switch 212 also receives each packet from input port 202. Packet switch 212 forwards each packet on to one or more of output ports 220, 222, and 224, as determined by the selected output path.

In the embodiment of the invention shown in FIG. 2, each selected output path corresponds to one or more of the physical output ports 220 to 224. Various embodiments of the invention may support various types of output paths, such as: next hops, dropping a packet that cannot or should not be forwarded, handling a packet that is a network command or a network status query, or forwarding a packet according to a generic router encapsulation (GRE) system.

In various embodiments of the invention, the components of forwarding engine 200 can be implemented as hardware, software, firmware, or a combination thereof. For example, input port 202, key extraction circuit 204, and hash circuit 206 can be implemented as application-specific integrated circuits (ASICs), gate arrays, systems on a chip (SoC), and the like. Also for example, selection circuit 208 can be implemented as a processor with a random access memory (RAM) for data, and a non-volatile memory (NVM) for program instructions.

In one embodiment of the invention, selection circuit 208 is implemented in hardware, but circuit 208 and the entire forwarding engine 200 operate under the control of network device management firmware. Such network device management firmware may perform, for example, the initialization function described in reference to FIG. 4. The Catalyst operating system (CatOS) or the Cisco IOS® interconnection operating system may be used as this management firmware. CatOS and IOS are manufactured by Cisco Systems, Inc.

Figure 3:
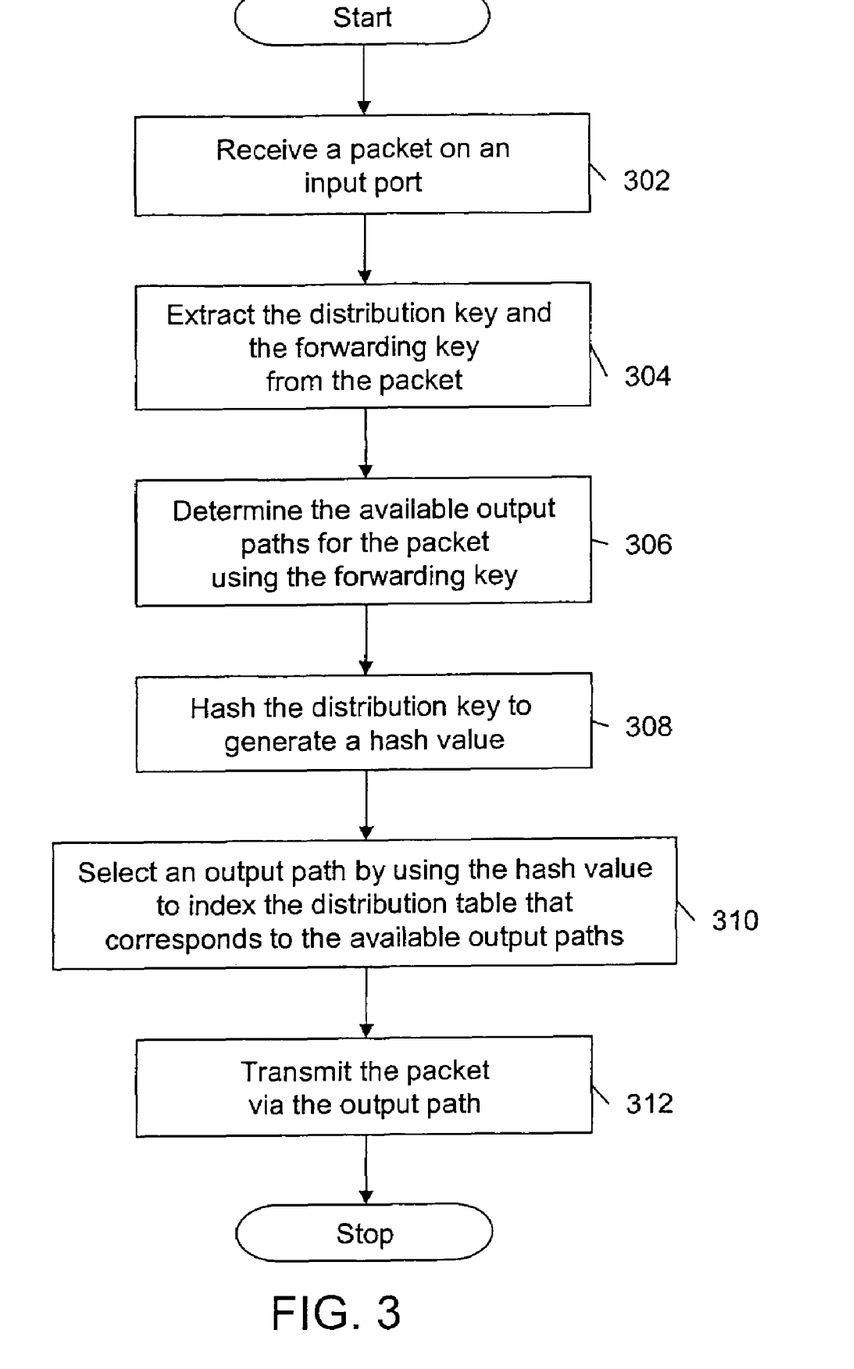
FIG. 3 is a flowchart illustrating a method for distributing packets across available output paths, in accordance with yet another embodiment of the present invention.

FIG. 3 is a flowchart illustrating a method for distributing packets across available output paths, in accordance with an exemplary embodiment of the present invention. This method repeats for each packet received.

At step 302, the forwarding engine receives a current packet that is to be re-transmitted. At step 304, the distribution key and forwarding key are extracted from the header of the current packet. This step is described in regard to key extraction circuit 204 of FIG. 2.

At step 306, the available output paths for the current packet are determined. The available output paths are those output paths over which the current packet can be transmitted. This determination is made using the forwarding key extracted from the header of the current packet and using one or more forwarding tables.

Various embodiments of the invention may use various designs for forwarding tables, which are known in the art. In embodiments where the forwarding key is the IP address of the destination device for the packet, the forwarding table may the usual design practices for IP forwarding tables, which are known in the art. For example, the destination IP address may be used as the key value for a lookup operation in a ternary content addressable memory (CAM). The contents of such a CAM are updated as the devices within the network and the topology of their interconnections change.

In one embodiment of the invention, each set of available output paths is represented as a sequence of data words that are returned as the result of the lookup operation within a single forwarding table. An exemplary sequence of words representing a set of available output paths is as follows: <number of available output paths, which is herein referred to as K>; <identifier of the first available output path>; <identifier of the second available output path, if any>; and so on until the <identifier of the Kth (the last) available output path>.

In another embodiment of the invention, all usable sets of available output paths are stored in a path set memory, which may be initialized at the time the network device is installed or reconfigured. The result of the lookup operation on the forwarding key is an output set identifier. The output set identifier is an address or an offset into this path set memory. The exemplary set of words, as described above, is stored within the path set memory at the address specified the output set identifier.

Various embodiments of the invention may use other designs for the forwarding table or tables. For example, the result of the forwarding key lookup may be both K, the number of available paths, and an output set identifier. This output set identifier, however, addresses a list of output paths stored in a path set memory, but the value of K is not stored in the path set memory.

Next at step 308, an N bit hash value for the current packet is generated by hashing the distribution key. This step is described in regard to hash circuit 206 of FIG. 2.

At step 310, a distribution table is indexed by all N bits of the hash value. The resulting word or table entry selects which one of the available output paths is to be used for the current packet. Typically, but not necessarily, the value of this word ranges from 1 to K, and this value is used as an offset within the set of available paths as stored within the path set memory. The contents of that word indicates the selected output path, e.g., physical output port number 3.

In embodiments of the invention where N equals 8, there are 8 bits in the hash value and the hash value can be any one of 256 different values. Thus, each distribution table must contain 256 different entries. For a 2 way distribution table where equal loading of each of the two available output paths is desired, exactly 128 of the entries in the distribution table should be 1, which indicates that the first of the two available output paths is to be selected. The other 128 entries should be 2, indicating the second available output path is to be selected.

However, to ensure that the network traffic is distributed in an approximately equal manner, the 1's and 2's should appear in a randomized order within the distribution table. This result, which may be surprising, has been verified by experiments and experience of the inventors of the present invention.

In particular, the inventors have seen that using a modulo function to reduce the 256 possible hash values to 2 or 4 possible values results in an undesirably unbalanced distribution in practical networks. This reduction in possible values is necessary in order to select a particular output path from the relatively small set of paths available for a particular packet based on the relatively large set of possible values of an 8 bit hash function.

Further, to ensure that a chain of network devices distribute network traffic at each point in the chain (as described with regard to FIG. 1), the randomized order should not be the same order that is used in any other network device within the same network.

This can be accomplished by using the same pseudo-random function to initialize each network device, but ensuring that the randomization seed used to initialize this function varies from device to device. For example, the seed value could be the MAC address of the device, the manufacturer's serial number of the device, or the time at which the device is initialized where the time is expressed as, for example, universal coordinated time (UTC) seconds.

In a more general embodiment of the invention N represents the number of bits of the hash value, and the hash value can be any one of $2^N$ different values. Thus, each distribution table must contain at least $2^N$ different entries.

Embodiments of the invention that use more than $2^N$ different entries in one or more of the distribution tables also include a mechanism to select which $2^N$ entries out of all the entries are used. Such a mechanism may, but need not be, part of the process of randomization of the distribution table. For example, a distribution table with X more than $2^N$ entries may be accessed using an offset value that corresponds to the randomization seed selected for each particular instance of the invention, where the offset value ranges from 0 to X.

Some embodiments of the invention store Max-K different distribution tables, where Max-K is the maximum value of K that is supported by the network device. Two way distribution up to 4 way distribution, that is, K equals 2, 3 or 4, is commonly found in networks. Thus, a value of 6, 8, or 16 for Max-K is typically sufficient.

For some packets, there is only one available output path. In this situation, the value of K found in the forwarding table entry corresponding to that packet is 1. When K is 1, steps 308 and 310 are optional, that is, there is no need to distribute such packets over multiple output paths. Accordingly, some embodiments of the invention do not perform steps 308 and 310 when K is 1 and store only Max-K minus 1 different distribution tables.

In the other hand, in other embodiments of the invention, it may require less circuitry or be more uniform in design and design verification to use a distribution table that returns the same output path identifier, for example, the value 1, regardless of the hash value for the packet. Such embodiments of the invention store MaxK different distribution tables.

Additional distribution tables may be used in order to support unequal distribution of network traffic. For example, if it is desired to send ⅔ of a stream of packets along a first output path and ⅓ of the stream along a second output path, then approximately ⅔ of the entries in the corresponding distribution table should have a value of 1, and approximately ⅓ of the entries should have a value of 2. Of course, the order of such an unequal number of entries within a distribution table should be randomized.

In general, the relative frequencies with which each particular output path occurs within the distribution table should correspond to the relative frequency with which packets are to be sent over that particular output path.

In some embodiments of the invention, permutation groups are used to randomize the entries within a distribution table. Consider, for example, a 3 way distribution table. There are six possible permutation groups when K equals 3. These are: 123, 132, 213, 231, 312, and 321. A 3 way distribution table is initialized, according to the permutation group method, by selecting a number from 1 to 6 at random and using this number to select which of these 6 permutation groups is used to initialize the first 3 words of the distribution memory. A second random number from 1 to 6 is used to select which of the groups is used to initialize the second three words of the memory, and so on until all 256 words of the distribution table are initialized.

Permutation groups can be used to randomize the entries within a non-uniform distribution table. For example, there are 12 possible permutation groups when K equals 3, but output path 1 is to receive twice as many packets as output paths 2 and 3, two of these are, for example, 1123 and 1231. To initialize such a table, numbers from 1 to 12 are selected at random to determine which of the permutation groups are used to initialize the next 4 words of the distribution memory.

A wide variety of randomization techniques, randomization seeds, and pseudo-random functions are known in the art, any of which may be used in various embodiments of the invention.

Next at step 312, the packet is forwarded (or otherwise handled) according to the selected output path. This completes the method of handling a packet according to the embodiment of the invention shown in FIG. 3.

Figure 4:
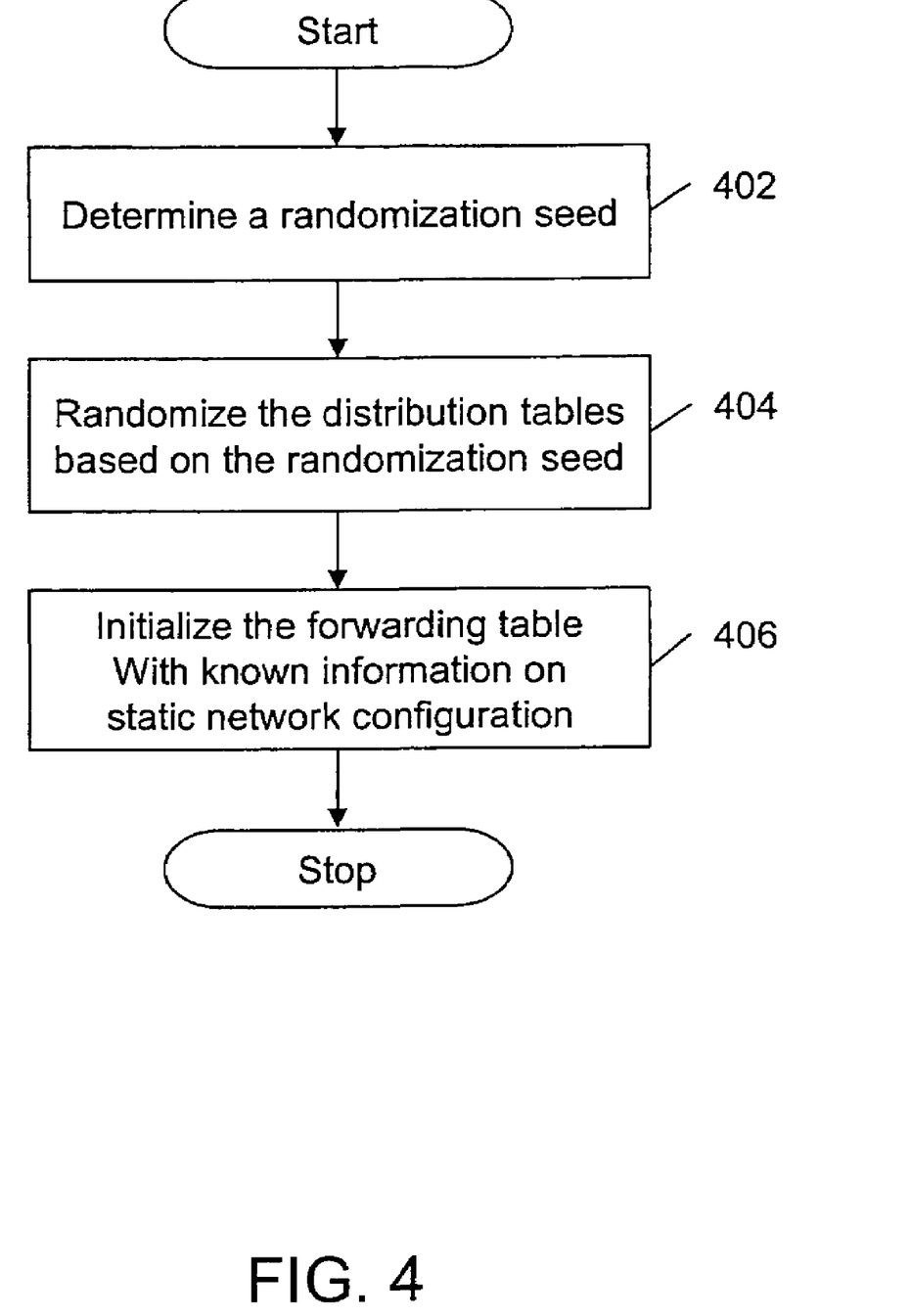
FIG. 4 is a flowchart illustrating a method for initializing the distribution of packets across available output paths, in accordance with an embodiment of the present invention.

FIG. 4 is a flowchart illustrating a method for initializing the distribution of packets across available output paths, in accordance with an embodiment of the present invention.

At step 402, a randomization seed is determined. This step is described with respect to step 310 of FIG. 3.

At step 404, the order of the entries within each distribution table is randomized based on a pseudo random function initialized with the randomization seed. This step is also described with respect to step 310 of FIG. 3.

At step 406, the forwarding table or tables used in the invention are initialized. Various embodiments of the invention may be used with various routing protocols, including but not limited to the routing information protocol (RIP) and the interior gateway routing protocol (IGRP). Initialization of forwarding tables for use with these protocols is known in the art.

In some embodiments of the invention, step 406 includes initializing the forwarding tables for a network that is statically configured to have totally redundant communication links. For example, some network devices may have two, three, or more communication links that convey packets between or among these devices.

Such totally redundant links are desirable to double, triple, or further increase the rate at which data is communicated between or among the devices. They may also be desirable to increase the reliability or security of the network; if one link becomes disabled the devices can still communicate, albeit at a reduced rate. However, realizing these advantages generally depends on the load of network traffic being appropriately balanced among the available routes. It may be desirable to include information on such static redundant links in the forwarding table or tables when they are first initialized.

Figure 5:
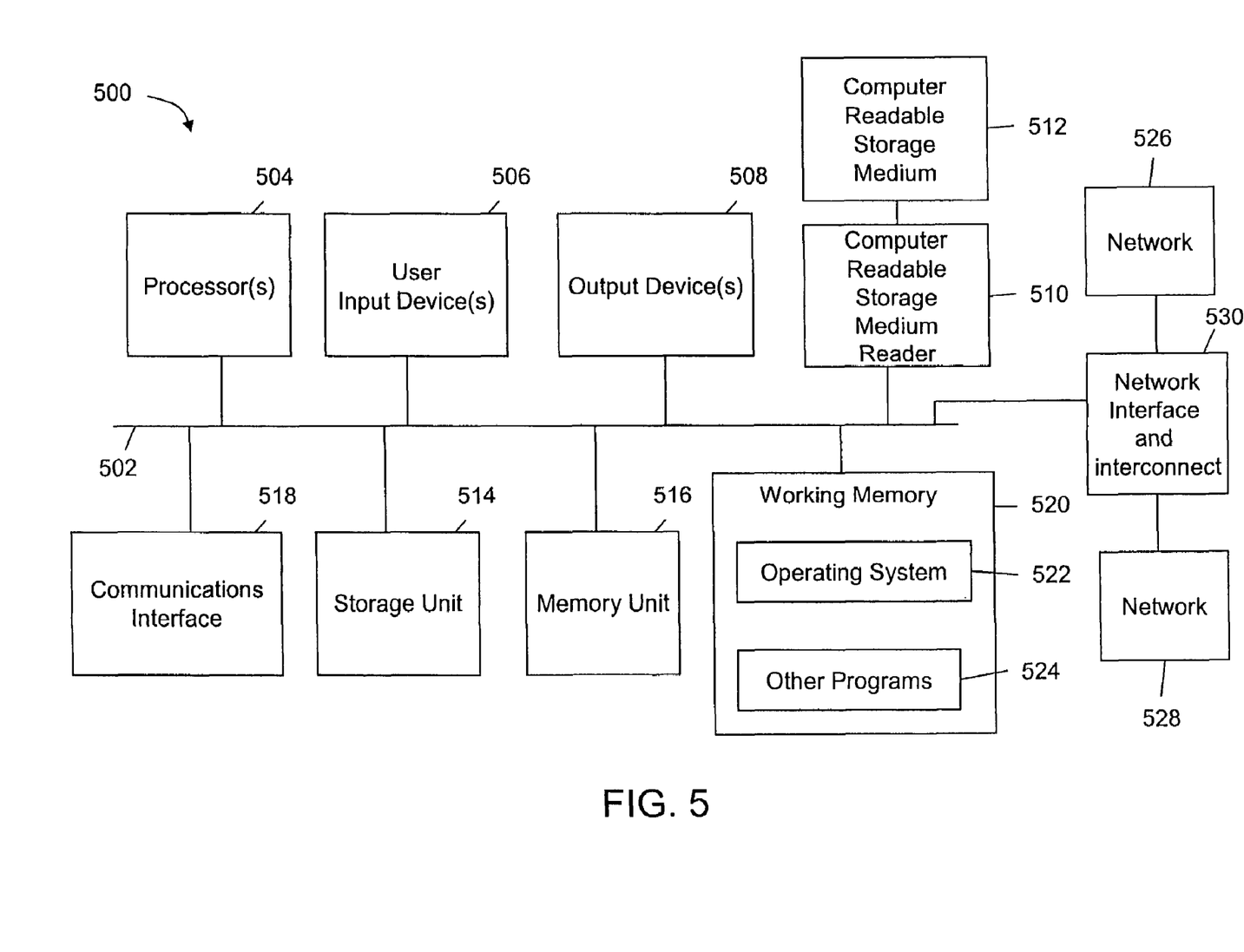
FIG. 5 is a block diagram of a computer system with a system for distributing packets across available output paths, in accordance with another embodiment of the present invention.

FIG. 5 is a block diagram of a computer system 500, for example, a network device, a server, a general-purpose computer, or the like. Various embodiments of the invention may use computer system 500, and variants thereon, in various ways.

Such uses include, but are not limited to, being used as one or more servers, network devices, workstations, personal computers; or as devices that interface with, control, or manage various aspects of various embodiments of the invention.

Computer system 500 includes one or more buses 502 that are configured to communicate information such as addresses, operation codes, or data. Computer system 500 also comprises one or more processors 504, configured to process information and data according to instructions and other data. Processor 504 may be, but is not limited to, a central processing unit, a microprocessor, an embedded processor, or a special purpose processor.

Computer system 500 may optionally include a memory unit 516, i.e., one or more devices or circuits configured to store information, data or instructions. Memory unit 516 may be, but is not limited to, random access memory (RAM), static RAM, or dynamic RAM. Further, memory unit 516 may optionally include read only memory (ROM), i.e., one or more non-volatile memory units or other devices or circuits configured to store static information and instructions. ROM may include, but is not limited to, one or more of: read only memory (ROM); programmable ROM; flash memory; electrically programmable ROM (EPROM); or erasable electrically-programmable ROM (EEPROM). Memory unit 516 is coupled to bus 502.

Computer system 500 may optionally include a working memory unit 520, i.e., one or more devices or circuits configured to carry out the instructions. Working memory unit 520 includes an operating system 522 and other programs 524. Operating system 522 runs various applications and programs on computer system 500. Further, operating system 522 allocates memory, hard disk space, and other system devices to the programs.

Computer system 500 may optionally include network interface and interconnect 530, i.e., one or more devices or circuits configured to interface with one or more other electronic devices via one or more networks, hereinafter referred to as networks 526 and 528. Network interface and interconnect 530 is coupled to bus 502, and may optionally perform one or more of switching, routing, bridging, or relay functions among networks 526 and 528. Networks 526 and 528 may include, but are not limited to, one or more of Internet protocol (IP) networks, asynchronous transfer mode (ATM) networks, frame relay networks, time division multiplexing (TDM) networks, or the public switched telephone network (PSTN).

Computer system 500 may optionally include one or more alphanumeric input devices 506, configured to communicate information and command selections from a user. Examples of input devices include a keyboard, a mouse, and the like. The keyboard may, for example, have alphabetic, numeric, function and control keys, buttons, selectors, or touch-sensitive screens. Input can be provided via a mouse, using special menus, click sequences or commands. A mouse may include, but is not limited to, one or more mouse, a track ball, a touch pad, an optical tracking device, a joystick, a game controller, a touch screen, or a glove. The input device is coupled to bus 502.

Computer system 500 may optionally include a storage unit 514, i.e., one or more devices or circuits configured to store information, data or instructions. Storage unit 514 may include, but is not limited to, one or more mass storage device, a magnetic disk, an optical disk, a hard disk, a flash memory, or a memory stick. Storage unit 514 is coupled to bus 502.

Computer system 500 may optionally include output devices 508, i.e., one or more devices or circuits configured to display output such as pictures, video, text, or graphics. Output devices 508 may include, but are not limited to, one or more cathode ray tube (CRT), a flat panel display, a liquid crystal display (LCD), a field emission display (FED), or a heads-up display, suitable for use in a vehicle. Output device 508 is coupled to bus 502.

Computer system 500 may optionally include a computer-readable storage medium 512, i.e., one or more devices or circuits configured to store information and data. Examples of a computer-readable storage medium include a compact disk (CD), a writeable CD, a digital versatile disk (DVD), a floppy disk, and the like.

Computer system 500 may optionally include a computer-readable storage medium reader 510, i.e., one or more devices or circuits configured to read the data and information contained in computer-readable storage medium 512. Examples of computer-readable storage medium reader 512 include a compact disk drive, a floppy disk drive, and the like.

The embodiments of the invention have the advantage of distributing the stream of packets across all the outgoing routes in a network, balancing the packet load across the outgoing routes. Another advantage is that the outgoing routes are utilized according to the transmission capacity of each route. Further, the invention uses the CRC polynomials, which are inexpensive and easy to implement.

Although the invention has been described with respect to specific embodiments thereof, these embodiments are merely illustrative, and not restrictive of the invention. For example, a system for distributing packets across all the outgoing routes, as shown in FIG. 2 is only illustrative. The invention may be embodied in telecommunication systems and devices with more or fewer components, other types of components, or other interconnection schemes.

Although the invention has been discussed with respect to specific embodiments thereof, these embodiments are merely illustrative, and not restrictive, of the invention. For example, a 'method for distributing the stream of packets across the outgoing routes' can include any type of analysis, manual or automatic, to anticipate the needs of the method.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. An apparatus for distribution of packets of network traffic across available output paths within a network, the apparatus comprising:
   an extraction circuit configured to extract a distribution key and a forwarding key from a header of each packet;
   a hash circuit configured to generate, for each packet, an N-bit hash value by applying a hash function to the distribution key, N being a positive integer;

a memory configured to hold $2^N$ indications of the available output paths that map to the N-bit hash value, wherein the available output path indications are determined using the forwarding key and held by the memory in a randomized order;

a selection circuit configured to receive the N-bit hash value and the forwarding key, and to access the memory to select an output path for each packet from among the available output path indications, wherein the selection is based on addressing the memory using each bit of the N-bit hash value for each packet; and a packet switch configured to forward each packet to an output port based on the selected output path from the selection circuit.

2. The apparatus of claim 1, wherein the randomized order is unique for each device in the network.

3. The apparatus of claim 2, wherein the randomized order depends on a randomization seed that varies among devices in the network.

4. The apparatus of claim 3, wherein the randomization seed corresponds to a value selected from a media access control (MAC) address, a manufacturer's serial number, or an initialization time.

5. The apparatus of claim 1, wherein the output path indications are held by the memory in an order such that for each particular bit of the N-bit hash value, there is at least one value of the other N−1 bits such that changing the value of that particular bit changes the value of the output path indication within the memory that is addressed by the hash value.

6. The apparatus of claim 1, wherein the relative frequencies with which the indications of the available output paths occur within the memory corresponds to the relative frequencies with which packets are to be sent over the available output paths.

7. The apparatus of claim 1, wherein the memory is configured to hold at least two sets of indications of available output paths, and wherein each set contains at least $2^N$ indications of the available output paths and each set corresponds to a particular number of available output paths.

8. The apparatus of claim 1, further comprising:

a memory configured to hold one or more forwarding tables;

wherein the selection circuit is further configured to determine a number of available output paths for each packet by looking up the forwarding key in the forwarding tables.

9. A system for distributing packets of network traffic across available output paths within a network, the system comprising:

means for extracting a distribution key and a forwarding key from a header of each packet;

means for hashing the distribution key for each packet to generate an N-bit hash value for that packet, N being a positive integer;

means for holding $2^N$ indications of the available output paths that map to the N-bit hash value, wherein the available output path indications are determined using the forwarding key and held by the holding means in a randomized order;

means for selecting an output path for each packet from among the available output path indications, wherein the selecting is based on addressing the holding means using each bit of the N-bit hash value for each packet; and means for forwarding each packet to an output port based on the selected output path from the selecting means.

10. The system of claim 9, further comprising:

means for holding one or more forwarding tables;

wherein the selecting means comprises a means for determining the available output paths for each packet by looking up the forwarding key in the forwarding tables.

11. The system of claim 9, wherein the extracting means comprises a means for extracting the distribution key such that the distribution key includes an indication of a source device corresponding to the packet and an indication of a destination device corresponding to the packet.

12. A method of distributing packets of network traffic across available output paths within a network, the method comprising:

extracting a distribution key and a forwarding key from a header of each packet;

hashing the distribution key to generate an N-bit hash value, N being a positive integer;

looking up the hash value within $2^N$ indications of the available output paths that map to the N-bit hash value, wherein the available output path indications are determined using the forwarding key and held by a memory in a randomized order;

selecting an output path for each packet using the looking up, wherein the looking up is based on each bit of the N-bit hash value; and sending each packet to an output port based on the selected output path.

13. The method of claim 12, wherein the randomized order is unique for each device in the network.

14. The method of claim 13, wherein the randomized order depends on a randomization seed that varies among devices in the network.

15. The method of claim 14, wherein the randomization seed corresponds to a value selected from a media access control (MAC) address, a manufacturer's serial number, or an initialization time.

16. The method of claim 12, further comprising initializing the indications of the available output paths in an order such that for each particular bit of the N-bit hash value, there is at least one value of the other N−1 bits such that changing a value of that particular bit changes the value of a resulting output path indication from looking up the N-bit hash value in the indications.

17. The method of claim 12, further comprising determining a number of available output paths by looking up the forwarding key in at least one forwarding table.

18. A computer-readable storage device containing instructions that, when the instructions are executed by a processor, are operable to:

extract a distribution key and a forwarding key from a header of each packet;

hash the distribution key to generate an N-bit hash value, N being a positive integer;

look-up the hash value within $2^N$ indications of the available output paths that map to the N-bit hash value, wherein the available output path indications are determined using the forwarding key and held by a memory in a randomized order;

select an output path for each packet using the look-up, wherein the look-up is based on each bit of the N-bit hash value; and send each packet to an output port based on the selected output path.

19. The computer-readable storage device of claim 18, wherein the instructions when executed are further operable to initialize the indications of the available output paths to have the randomized order.

20. The computer-readable storage device of claim 19, wherein the randomized order depends on a randomization seed that varies among devices in a network.

21. The computer-readable storage device of claim 20, wherein the randomization seed corresponds to a value selected from a media access control (MAC) address, a manufacturer's serial number, or an initialization time.

22. The computer-readable storage device of claim 18, wherein the process farther comprises initializing the indications of the available output paths in an order such that for each particular bit of the N-bit hash value, there is at least one value of the other N−1 bits such that changing a value of that particular bit changes the value of a resulting output path indication from looking up the N-bit hash value in the indications.

23. The computer-readable storage device of claim 18, wherein the instructions when executed are further
    operable to determine a number of available output paths by looking up the forwarding key in at least one forwarding table.

\* \* \* \* \*